（12) United States Patent
Sopel

(10) Patent No.: US 9,296,329 B1
(45) Date of Patent: Mar. 29, 2016

(54) ADJUSTABLE STRAP SYSTEM

(71) Applicant: Matthew John Sopel, Friendswood, TX (US)

(72) Inventor: Matthew John Sopel, Friendswood, TX (US)

( * ) Notice: Subject to any disclaimer, the term of this patent is extended or adjusted under 35 U.S.C. 154(b) by 0 days.

(21) Appl. No.: 14/846,333

(22) Filed: Sep. 4, 2015

Related U.S. Application Data

(60) Provisional application No. 62/045,878, filed on Sep. 4, 2014.

(51) Int. Cl.
*B60P 7/08* (2006.01)

(52) U.S. Cl.
CPC ................................. *B60P 7/0823* (2013.01)

(58) Field of Classification Search
CPC .................................................. B60P 7/0823

USPC ............ 410/31, 32, 34, 36, 96, 97, 100, 120, 410/143; 248/499; 24/302, 306.442; 403/325
See application file for complete search history.

(56) References Cited

U.S. PATENT DOCUMENTS 5,603,591 A * 2/1997 McLellan ............. B60P 7/0823
 410/97
6,120,224 A * 9/2000 Powell .................... B60P 7/15
 410/32

* cited by examiner

*Primary Examiner* — Stephen Gordon

(57) ABSTRACT

An adjustable strap system is configured to join a load bar to a wall. The adjustable strap system has a strap sewn to itself creating a first end tab. A hook fastener and a loop fastener are sewn to a first side of the strap creating a strap space therebetween. A ring pocket is sewn within the strap. A rectangular ring has a first side in the strap space and a second side in the ring pocket. A clip pocket is sewn with in the strap. The clip pocket is adapted to accommodate a fixed clip. The fixed clip and a movable clip on the strap are operatively connected to the wall such that a load bar surrounded by the strap is tethered to the wall.

6 Claims, 4 Drawing Sheets

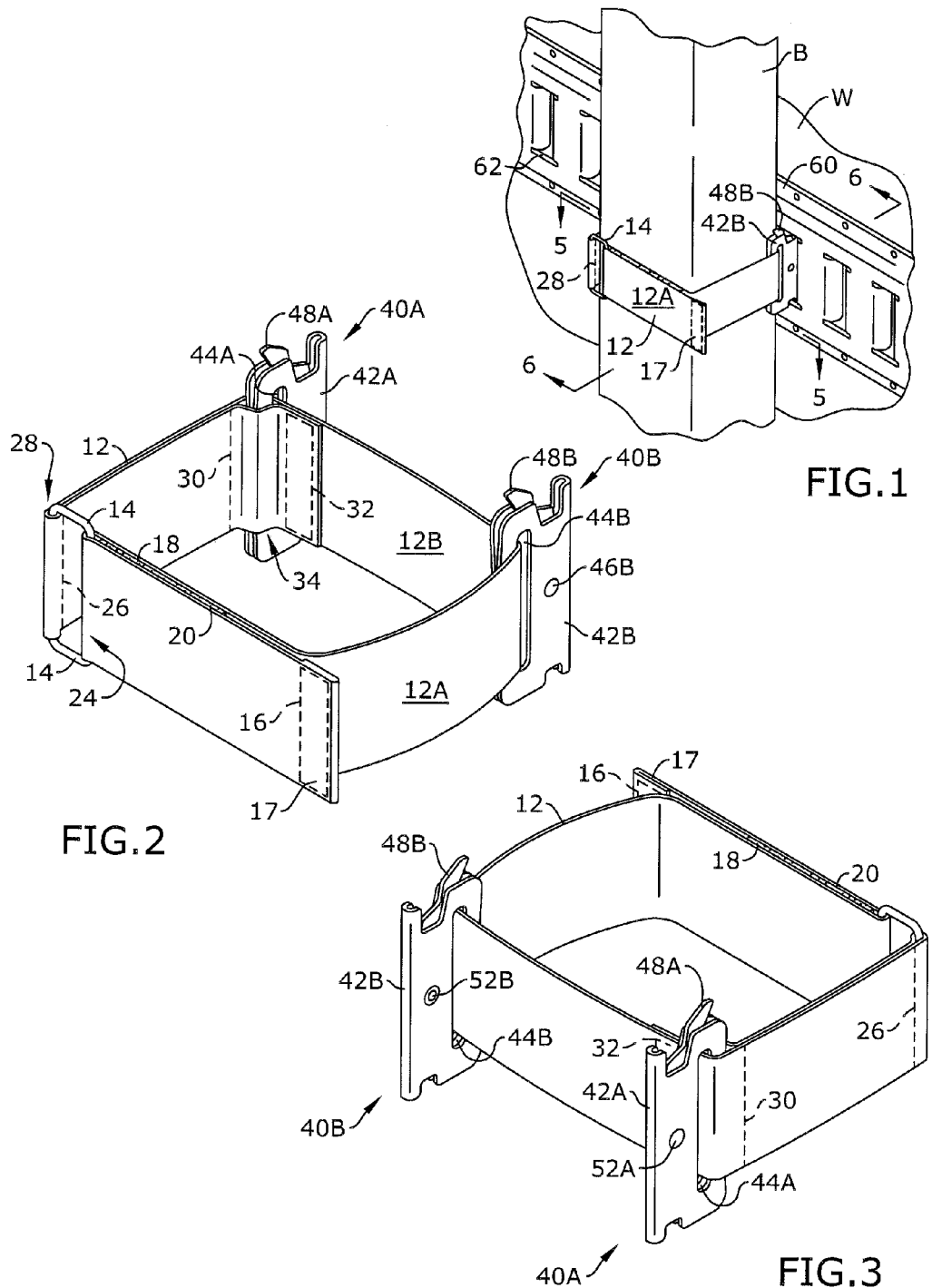

ADJUSTABLE STRAP SYSTEM

RELATED APPLICATION

This application claims priority to provisional patent application U.S. Ser. No. 62/045,878 filed on Sep. 4, 2014, the entire contents of which is herein incorporated by reference.

BACKGROUND

The embodiments herein relate generally to cargo storage.

Prior to embodiments of the disclosed invention, there was no place to store load bars or decking beams inside a freight trailer, except on the floor. When a trailer was loaded or unloaded with freight, bars that were left on the floor could get run over/damaged by fork lifts, or if removed to the loading dock, could be left there and lost. Such damage and loss was expensive for trucking companies and occurred on a daily basis. Embodiments of the disclosed invention solve these problems.

SUMMARY

An adjustable strap system is configured to join a load bar to a wall. The adjustable strap system has a strap sewn to itself creating a first end tab. A hook fastener and a loop fastener are sewn to a first side of the strap creating a strap space therebetween. A ring pocket is sewn within the strap. A rectangular ring has a first side in the strap space and a second side in the ring pocket. A clip pocket is sewn with in the strap. The clip pocket is adapted to accommodate a fixed clip. The fixed clip and a movable clip on the strap are operatively connected to the wall such that a load bar surrounded by the strap is tethered to the wall.

In some embodiments, first rectangular stitching creates the first tab. First straight line stitching can create the ring pocket. Second rectangular stitching and second rectangular stitching can create the clip pocket.

In some embodiments, the fixed clip can further comprise a fixed clip body having a fixed clip slot and a fixed clip hole. A fixed tongue is inserted into the fixed clip body with a fixed spring.

In some embodiments, the moveable clip can further comprise a moveable clip body having a moveable clip slot and a moveable clip hole. A moveable tongue is inserted into the moveable clip body with a moveable spring.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of an embodiment of the invention, shown in use.

FIG. 2 is a front perspective view of an embodiment of the invention.

FIG. 3 is a rear perspective view of an embodiment of the invention.

DETAILED DESCRIPTION OF CERTAIN EMBODIMENTS

Figure 4:
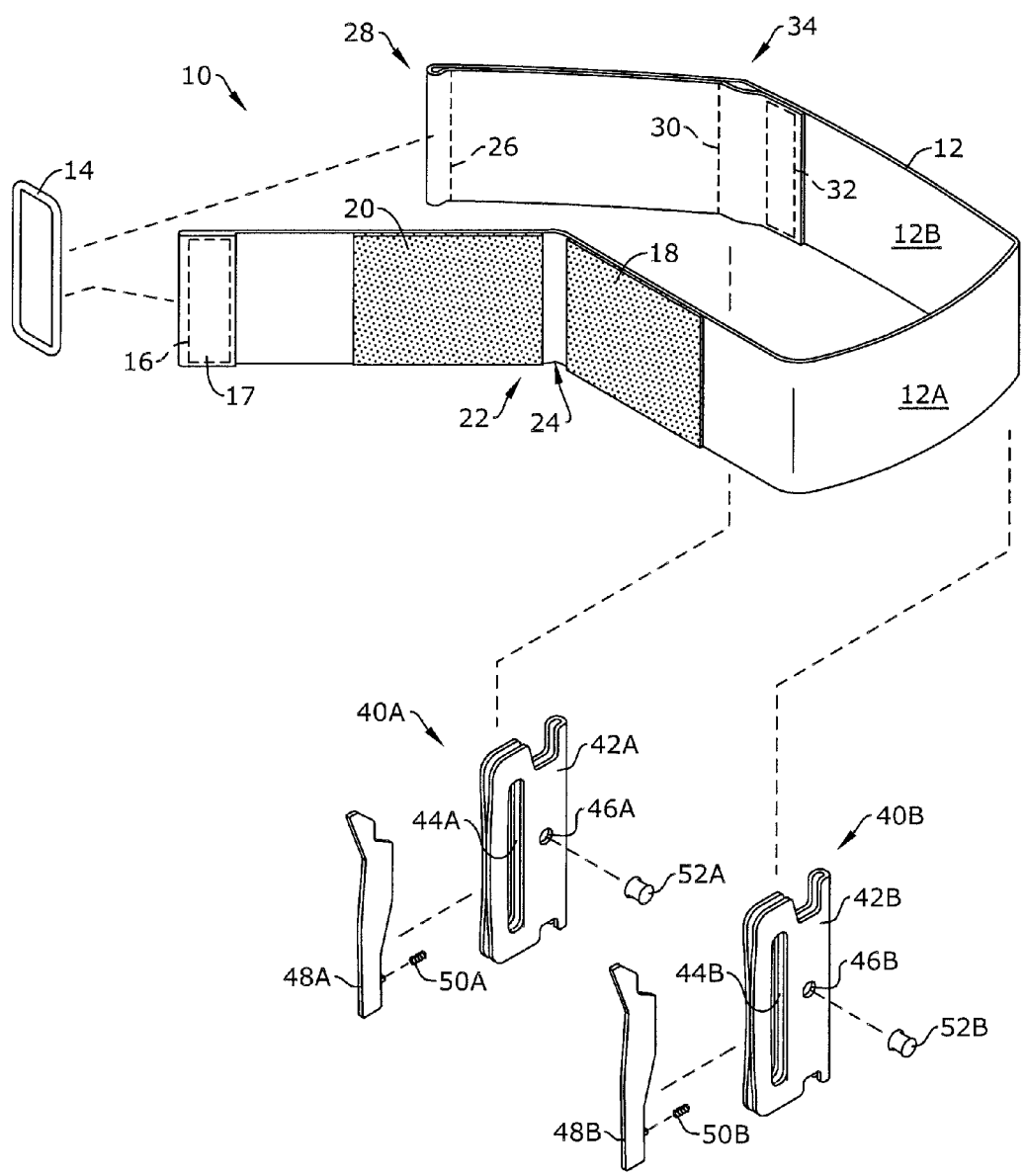
FIG. 4 is an exploded view of an embodiment of the invention.
Figure 5:
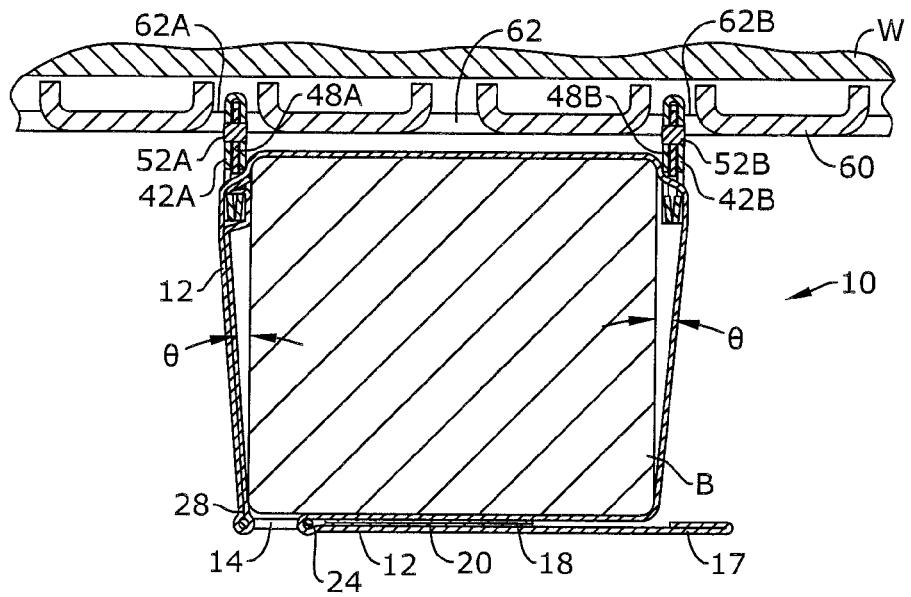
FIG. 5 is a section view of an embodiment of the invention, taken along line 5-5 in FIG. 1.
Figure 6:
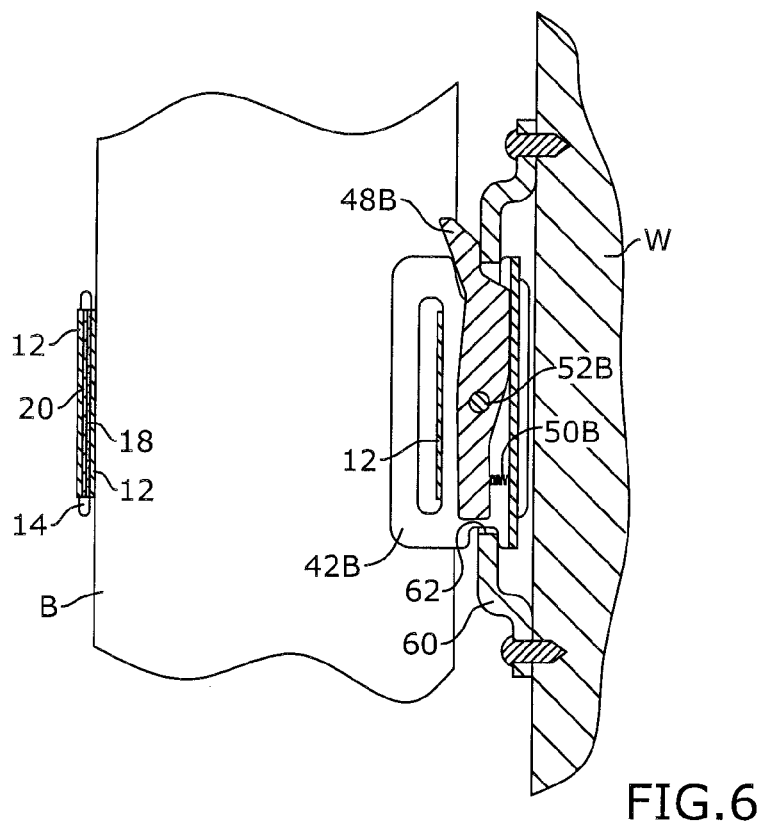
FIG. 6 is a section view of an embodiment of the invention, taken along line 6-6 in FIG. 1.

By way of example, and referring to FIGS. 1-4, one embodiment of adjustable strap system 10 further comprises strap 12. Strap 12 has a front side and a back side, called strap first side 12A and strap second side 12B. Strap 12 is wrapped around a first end of rectangular ring 14 in strap space 24 and then sewn to itself with first rectangular stitching 16 forming first end tab 17. Strap 12 further comprises strap first side 12A and strap second side 12B. Strap first side 12A is further attached to strap hook fastener 18 and strap loop fastener 20. Collectively strap hook fastener 18 and strap loop fastener 20 form hook and loop fastener 22 (the label 22 is not in any of the three Figures). Strap space 24 exists between strap hook fastener 18 and strap loop fastener 20. Strap first side 12A is joined to strap second side 12B with first straight line stitching 26. This forms ring pocket 28 which is adapted to accommodate a second end of rectangular ring 14. Strap first side 12A is further joined to strap second side 12B with second straight line stitching 30 and second rectangular stitching 32. This forms clip pocket 34 between second straight line stitching 30 and second rectangular stitching 32.

In some embodiments this system can be used with two clips. Fixed clip 40A comprises fixed clip body 42A having fixed clip slot 44A and fixed clip hole 46A. Fixed tongue 48A is inserted into fixed clip body 42A is fixed spring 50A. Fixed clip 40A is a single piece of metal bent in half and held together with fixed rivet 52A.

Similarly, movable clip 40B comprises movable clip body 42B having movable clip slot 44B and movable clip hole 46B. Movable tongue 48B is inserted into movable clip body 42B is movable spring 50B. Movable clip 40B is a single piece of metal bent in half and held together with movable rivet 52B.

Combining the clips 40A, 40B with strap 12, can be done in the following manner. Fixed clip 40A is inserted into clip pocket 34 and then sewn into place with second straight line stitching 30. Movable clip 40B slides past first end tab 17 and past hook and loop fastener 22 where it can slide between second rectangular stitching 32 and strap hook fastener 18 as needed.

One potential use for the system is to hold load bar B against wall W. Wall W is attached to e-track 60. E-track 60 comprises a plurality track clip rails 62. For the purposes of illustration, first track clip 62A and second track clip 62B are drawn. Fixed clip 40A fits inside first track clip 62A and movable clip 40B fits inside second track clip 62B. In this regard, rectangular ring 14 is parallel to a forward face of load bar B while strap 12 is offset from sides of load bar B and parallel and immediately adjacent to a back of load bar B.

Figure 7:
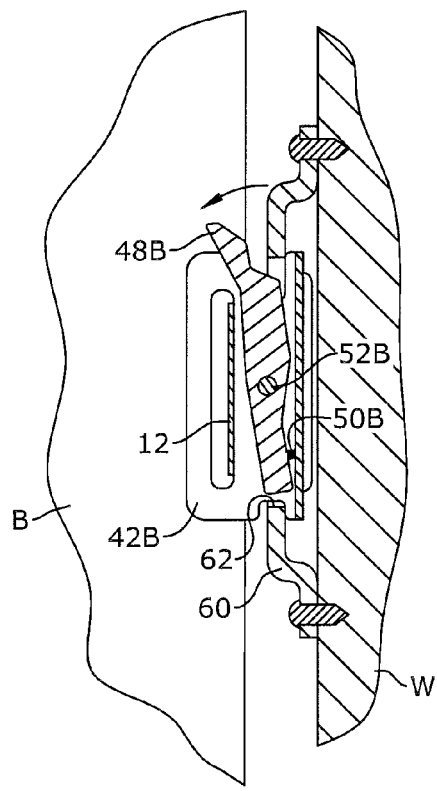
FIG. 7 is a section view of an embodiment of the invention, illustrating the lifting of the tongue to the release clip.
Figure 8:
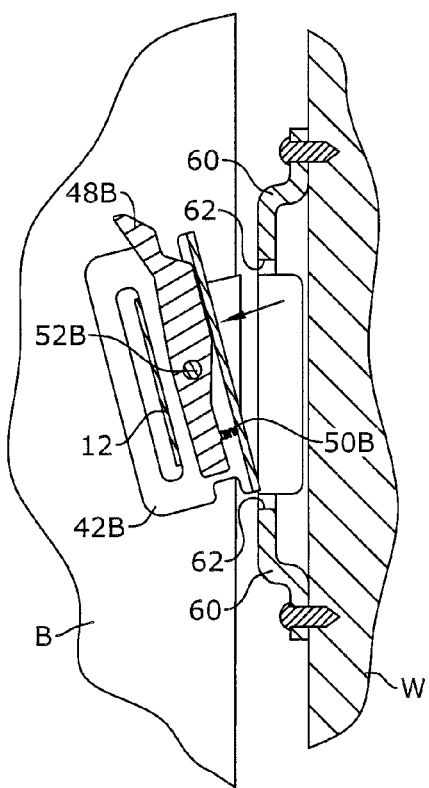
FIG. 8 is a section view of an embodiment of the invention, illustrating the removal of the clip.

While unfastening strap 12 from itself by disengaging hook and loop fastener 22 would likely be more common. Movable clip 40B can be disengaged from second track clip 62B by pulling movable tongue 48B away from second track clip 62B as shown in FIG. 7 and FIG. 8.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. §112, ¶6. In particular, any use of "step of" in the claims is not intended to invoke the provision of 35 U.S.C. §112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An adjustable strap system, configured to join a load bar to a wall, the adjustable strap system comprising;
   a strap sewn to itself creating a first end tab;
   a hook fastener and a loop fastener sewn to a first side of the strap with a strap space therebetween;
   a ring pocket, sewn within the strap;
   a rectangular ring, with a first side in the strap space and a second side in the ring pocket;
   a clip pocket, sewn with in the strap, wherein the clip pocket is adapted to accommodate a fixed clip;
   wherein the fixed clip and a movable clip on the strap are operatively connected to the wall such that a load bar surrounded by the strap is tethered to the wall.

2. The adjustable strap system of claim 1, wherein first rectangular stitching creates the first tab.

3. The adjustable strap system of claim 2, wherein first straight line stitching creates the ring pocket.

4. The adjustable strap system of claim 3, wherein second rectangular stitching and second straight line stitching create the clip pocket.

5. The adjustable strap system of claim 1, wherein the fixed clip further comprises
   a fixed clip body having a fixed clip slot and a fixed clip hole;
   a fixed tongue inserted into the fixed clip body with a fixed spring.

6. The adjustable strap system of claim 5, wherein the moveable clip further comprises
   a moveable clip body having a moveable clip slot and a moveable clip hole;
   a moveable tongue inserted into the moveable clip body with a moveable spring.

\* \* \* \* \*